United States Patent [19]

Bardoliwalla et al.

[11] Patent Number: 4,622,370

[45] Date of Patent: Nov. 11, 1986

[54] AQUEOUS DRILLING FLUIDS CONTAINING FLUID LOSS ADDITIVES

[75] Inventors: Dinshaw F. Bardoliwalla, Randolph; José L. Villa, Bridgewater, both of N.J.

[73] Assignee: Diamond Shamrock Chemicals Company, Dallas, Tex.

[21] Appl. No.: 605,933

[22] Filed: May 1, 1984

[51] Int. Cl.$^4$ .................... C08F 220/04; C08F 220/06
[52] U.S. Cl. ................................. 526/75; 525/329.7; 526/240; 526/312; 526/318.2
[58] Field of Search ...................... 525/329.7; 526/240, 526/312, 317, 75, 318.2

[56] References Cited

U.S. PATENT DOCUMENTS

| | | | |
|---|---|---|---|
| 2,552,775 | 5/1951 | Fischer et al. | 526/240 |
| 2,718,497 | 9/1955 | Oldham et al. | 252/8.5 |
| 2,798,053 | 7/1957 | Brown | 526/317 |
| 2,858,281 | 10/1958 | Bauman et al. | 526/317 |
| 2,956,046 | 10/1960 | Glavis et al. | 526/240 |
| 3,070,583 | 12/1962 | Uraneck et al. | 526/240 |
| 3,308,067 | 3/1967 | Diehl | 252/554 |
| 3,366,509 | 1/1968 | Coglianese et al. | 428/394 |
| 3,507,647 | 4/1970 | Sanders | 430/49 |
| 4,293,427 | 10/1981 | Lucas et al. | 252/8.5 C |
| 4,384,096 | 5/1983 | Sonnabend | 526/317 |
| 4,485,223 | 11/1984 | Walinsky | 526/318.2 |

FOREIGN PATENT DOCUMENTS 31-6738 8/1956 Japan.
2054548 2/1981 United Kingdom.

OTHER PUBLICATIONS

Marvel et al, J. Org. Chem., 24, No. 1, (1959), pp. 599–605.
CA, 52:20981h (1958).
CA, 87:25579e (1977).
CA, 93:120386x (1980).
CA, 99:110801p (1983).
Scanley, World Oil, Jul. 1959, pp. 122–128.
Scanley, Am. Chem. Soc., Div. of Petrol. Chem. Preprints, 7(1), pp. 65–70 (1962).

*Primary Examiner*—Harry Wong, Jr.
*Attorney, Agent, or Firm*—Neal T. Levin

[57] ABSTRACT

Copolymers of (1) from about 80% to about 98% by weight of acrylic acid and (2) from about 2% to about 20% by weight of itaconic acid and having a weight average molecular weight of between about 50,000 to about 1,000,000, preferably between about 100,000 to about 500,000, and which are at least water dispersible, are used as fluid loss control additives for aqueous drilling fluids and are particularly advantageous when used with muds containing soluble calcium and muds containing chloride ions such as seawater muds. An example is a copolymer of 95% by weight acrylic acid and 5% by weight itaconic acid in its sodium salt form.

6 Claims, No Drawings

AQUEOUS DRILLING FLUIDS CONTAINING FLUID LOSS ADDITIVES

BACKGROUND OF THE INVENTION

1. Field of the Invention

This invention relates to particular copolymers of acrylic acid and itaconic acid which are at least water dispersible and their use as fluid loss control additives for aqueous drilling fluids which are used in drilling wells in subterranean formations.

2. Description of the Prior Art

Rotary systems are generally used in drilling oil and gas wells. These systems depend upon rotation of a string of drill pipe to the bottom of which is attached a drill bit. The bit cuts into the formation causing the cuttings to accumulate as drilling continues. A drilling fluid is used which lubricates the drill bit and carries cuttings to the surface for removal. This allows the bit to continue functioning and the bottom hole to be clean and free of cuttings. The drilling fluid is also the source of pressure which is exerted against the formation. Even in other drilling systems, drilling fluids are still needed to remove bore hole cuttings and to otherwise perform functions related to drilling fluids.

Oil and gas producing formations are generally porous layers having varying degrees of permeability to the flow of fluids such as oil, water or gas. When drilling through such porous formations, it is essential to employ drilling fluids having characteristics such that excessive amounts of the drilling fluids do not penetrate the porous formation. Drilling fluids have a tendency to penetrate the formation because pressure in the bore hole is greater than the pressure opposing it which comes from the formation. Should excess penetration occur, there is loss of drilling fluid into the formation resulting in loss of pressure, inability to drill and remove cuttings and in the case of loss from brine muds, extra expense because of their cost. Mere filter cake formation on the wall of the bore hole does not adequately eliminate fluid loss.

According to U.S. Pat. No. 4,293,427, Lucas et al, Oct. 6, 1981, various materials have been added to drilling fluids to control fluid loss and have included materials such as pregelatinized starch, sodium carboxymethyl cellulose, sodium polyacrylates and lignites.

U.S. Pat. No. 2,718,497—Oldham et al, Sept. 20, 1955, discloses that polymers of acrylic acid when added to drilling muds reduce fluid loss of same. The muds to which the polymer is added do not contain calcium or chloride ions.

C. S. Stanley in World Oil, July 1959 (pages 122–128) describes studies, including fluid loss studies, of acrylic acid-acrylamide copolymers of various carboxylate/amide ratios and molecular weights on mud formulations.

C. S. Stanley in American Chemical Society, Division Petroleum Chemical Preprints 7(1), pages 65–70 (1962), describes fluid loss control studies on clay-water suspensions used as oil well drilling fluids using a copolymer of about 200,000 molecular weight consisting of about 70 mole % sodium acrylate and 30 mole % acrylamide.

CA 87:25579e (1977) discloses a water loss reducer and stabilizer of drilling fluids prepared by partial hydrolysis of an acrylonitrile itaconic acid copolymer.

CA 52:20981h (1958) discloses salts of polymethacrylic or polyacrylic acid used as modifiers for cement or mortar, including salts of copolymers of methacrylic or acrylic acid and maleic, fumaric or itaconic acid.

CA 93:120386x (1980) discloses synthesis of polycarboxylic acids and the properties of cement formed by their reaction with ion-leachable glasses. A copolymer of acrylic and itaconic acids combined several favorable characteristics.

CA 99:110801p (1938) discloses dental cements containing glass particles coated with polymers. Acrylic acid-itaconic acid copolymer is disclosed.

Where polyacrylates are added to fresh water muds, fluid loss can be reasonably controlled. However, where soluble calcium or chloride ions are present in the muds, generally in excess of about 300 ppm of soluble calcium ions and in excess of about 1,000 ppm of chloride ions, as for example from the cement or from the formation in the case of the former and from seawater (brine) and salt water in the case of the latter, particularly under conditions of high temperature and pressure, polyacrylates are not as effective in controlling fluid loss.

SUMMARY OF THE INVENTION

Particular copolymers of acrylic acid and itaconic acid which are at least water dispersible have been found to be outstanding fluid loss control additives, not only for fresh water muds, but also for muds having high soluble calcium and chloride concentrations, especially under conditions of high temperature and pressure.

These copolymers are added to water based drilling fluids, usually muds, which are then used in the conventional manner. Drilling fluids, particularly muds containing soluble calcium ions in excess of about 300 ppm and muds containing chloride ions in excess of about 1,000 ppm, which contain these copolymers are characterized by outstanding fluid loss properties when employed under conditions of high temperature and pressure such as in excess of 300° F. and 500 psi. Thus, these copolymers are not only as effective as polyacrylate homopolymers when used as fluid loss additives with fresh water muds, but are far superior than polyacrylate homopolymers when used as fluid loss additives for high calcium and high chloride muds under conditions of high temperature and pressure.

DESCRIPTION OF THE PREFERRED EMBODIMENTS

The Copolymers

The copolymers are copolymers of (1) from about 80% to about 98% by weight of acrylic acid and (2) from about 2% to about 20% by weight of itaconic acid and are at least water dispersible, i.e., water dispersible or water soluble. They have a weight average molecular weight of between about 50,000 to about 1,000,000, preferably between about 100,000 to about 500,000. They can be used in the free acid form or in the form of any partially or completely neutralized salt or quaternary salt form so long as they are at least water dispersible. Examples are the sodium, potassium and ammonium salts. Of course, the form of the copolymer is dependent upon the pH of the mud. For example, if the copolymer is introduced into the mud in its free acid form, as a result of the alkalinity of the mud, it may actually be present in the mud in the form of its partially or completely neutralized salt form.

These copolymers are present in the various drilling fluids including soluble calcium and chloride ion containing muds in amount sufficient to reduce fluid loss of the drilling fluid, for example, in amounts of from about 0.5 to about 10 pounds, preferably from about 2 to about 6 pounds per 42 gallon barrel of drilling fluid.

The copolymers can be prepared from their respective monomers by conventional polymerization procedures, viz., solution, emulsion or bulk polymerization in the presence of conventional free radical initiators. Such procedures are well documented in the literature and do not form a part of this invention.

Examples of copolymers are (percents are weight percents):
 sodium salt of the copolymer of acrylic acid (95%) and itaconic acid (5%)
 potassium salt of the copolymer of acrylic acid (90%) and itaconic acid (10%)
 free acid of the copolymer of acrylic acid (80%) and itaconic acid (20%)
 ammonium salt of the copolymer of acrylic acid (90%) and itaconic acid (10%)

Optionally, the dry copolymer in free acid or partially neutralized form can be admixed with carbonate, e.g., sodium carbonate (soda ash), in amounts up to about 40% by weight in order to bring about complete neutralization of the copolymer and eliminate subsequent pH adjustment of the mud containing same. The copolymer can be added to the drilling fluid formulations in dry, solution or emulsion form.

Drilling Fluids

The copolymers can be used with a wide variety of water based drilling fluids such as clear drilling fluids, low solids muds, bentonite and weighted muds. Muds can be classified as fresh water, soluble calcium ion and chloride ion containing muds. The latter two generally have present soluble calcium ions in excess of about 300 ppm and chloride ions in excess of about 1,000 ppm, respectively. These drilling fluids, including the muds and their preparation, are well known in the drilling art. For purposes of evaluation, the following procedures were used to prepare muds having the compositions set forth in Table I.

Fresh water mud was prepared by slowly adding a clayey material, bentonite, with high shear mixing, e.g., using a Premier Series 2000 Dispersator from Premier Mill Corp., to distilled water followed by mixing for one hour. Thereafter, the resulting bentonite slurry was allowed to hydrate for 48 to 72 hours.

Calcium mud and seawater mud I were prepared by adding the required amount of calcium chloride or sodium chloride plus sea salt to bentonite as prepared above followed by stirring for 30 to 45 minutes.

Thinner base mud was prepared by adding sodium chloride and calcium carbonate to distilled water while mixing. Thereafter, the following clay materials were added slowly in the following order: rev dust, Wyoming bentonite and calcium bentonite. Each clay was then mixed for 10 minutes at medium speed with a Premier Series 2000 Dispersator before adding the next clay. After adding the last clay, the mix was stirred for 30 minutes at medium speed and then aged overnight at room temperature.

Seawater mud II was prepared by adding sea salt to thinner base mud and then stirring the mixture for 45 minutes.

In the case of all muds, before obtaining a sample from stock for polymer evaluation, the mud is stirred for 2 to 3 minutes to ensure homogeneity and the pH of the mud is adjusted individually to pH 10 before adding the polymer.

The mud compositions appear below.

TABLE I

| | | | MUD COMPOSITIONS | | |
|---|---|---|---|---|---|
| Ingredients | Fresh Water Mud (% by wt.) | Seawater Mud I (% by wt.) | Thinner Base Mud (% by wt.) | Seawater Mud II (% by wt.) | 2000 PPM $Ca^{++}$ Mud (% by wt.) |
| Water | 93.96 | 78.81 | 85.65 | 82.77 | 93.27 |
| Wyoming bentonite | 6.04 | 2.29 | 6.12 | 5.91 | 6.00 |
| OCMA clay* | — | 16.02 | — | — | — |
| NaCl | — | 1.60 | 0.21 | 0.21 | — |
| Salt | — | } 2.88 | } 3.59 | — | |
| Sea salt | — | 1.28 | — | 3.38 | — |
| Calcium bentonite | — | — | 5.14 | 4.96 | — |
| REV dust** | — | — | 2.45 | 2.36 | — |
| Calcium carbonate | — | — | 0.43 | 0.41 | — |
| $CaCl_2.2H_2O$ | — | — | — | — | 0.73 |
| Total | 100.00 | 100.00 | 100.00 | 100.00 | 100.00 |
| pH | 10.00 | 10.40 | 10.00 | 10.00 | 10.00 |

*Mixture of kaolin and china clay
**Drilling solids which is a mixture of barite and clay

Evaluation of Copolymers as Fluid Loss Additives

The following procedures were utilized to evaluate the copolymers as fluid loss additives in the various drilling muds.

Preparation of Test Samples (Polymer Plus Mud)

350 ml of mud is placed in a stainless steel beaker. The required amount of polymer is weighed in a weighing dish (1 gram of polymer in 350 ml mud equals 1 pound per barrel). With thorough mixing, the polymer is added slowly to the mud and mixed for an additional 15–20 minutes. The pH of the mud is monitored during mixing and adjusted to pH 10, if necessary. After the mixing period, viscosities and gel strength of the mud can be measured if desired using a Fann viscometer (Model 35-A). Fluid loss measurements are then run on the samples.

API Fluid Loss Test

Equipment: IMCO Standard Filter Press #R1100 (supplied by Imco Services Div. of Halliburton Company). Nitrogen gas cylinder for pressurizing the fluid loss cell.

Test Conditions: 77° F., 100 psi pressure. Collect filtrate for 30 minutes.

Procedure:
1. The mud sample is placed in the cell of the filter press, cell filled to within ¼" of the top.
2. The cell is placed in the filter press frame.
3. 100 psi pressure (using nitrogen gas) is applied to the filter cell and timing of the test is started.
4. At the end of 30 minutes, the volume of filtrate collected is read. The lower the volume of filtrate collected, the more effective is the polymer in preventing loss of fluid from the mud formulation.

High Temperature High Pressure Fluid Loss Test

This test method is described in Baroid Drilling Mud Data Book, Section 900, pp. 26-27 entitled, "High Temperature Filtration Testing for Drilling Fluids." The following summarizes the equipment, conditions and procedure.

Equipment: HPHT Filter Press, Model #387 (supplied by NL Baroid, Houston, Tex.), which includes cell and heating jacket.

Test Conditions: Temperature can be varied from 200°-400° F. Pressure is normally set at 500 psi differential (600 psi at top, 100 psi back pressure at bottom).

Procedure:
(a) The mud sample is placed into the fluid loss cell.
(b) The cell is placed into the heating jacket.
(c) Top and bottom pressure lines are connected.
(d) After ensuring that the stems on the fluid loss cell are shut, 250 psi top and 100 psi bottom pressure is applied using nitrogen gas.
(e) The cell is heated to the required temperature (in about one hour's time) and equilibrated at the temperature for an additional half hour.
(f) The bottom stem is opened, then the top stem and any collected fluid is bled out.
(g) Top pressure is set to 600 psi.
(h) Time is recorded and fluid loss readings are taken at intervals of 1, 3, 7½ and 30 minutes.
(i) Total volume of filtrate collected after 30 minutes is recorded and multiplied by two (correction for 3.5 sq. inch filtration area versus 7 sq. inch area).

Heat Aging Test

Equipment: Aging cell, Model #76017 obtained from NL Baroid, Houston, Tex. Roller or forced air oven.

Procedure:
(a) Mud containing polymer is placed in aging cell.
(b) The contents of the cell are pressurized with nitrogen gas using the recommended pressures provided in FIG. 29, page 900-32 of "Mud Volume and Pressure for High Temperature Aging", NL Baroid, Drilling Mud Data Book, Section 900.
(c) The cell is then placed in a roller oven pre-heated to the desired heat aging temperature (dynamic heat aging) or a forced air oven (static heat aging) for 16 hours. All testing is dynamic heat aging unless indicated otherwise.
(d) At the end of the heat aging period, the aging cell is removed from the oven, cooled under cold running water, pressure released and the aged mud transferred into a stainless steel beaker.
(e) The pH of the mud is checked and if necessary adjusted to between 8.5 to 10. Rheology measurements are run using Fann viscometer, Model 35-A followed by the fluid loss test which is either the API or high temperature high pressure fluid loss test described previously.

Mud Rheology

Plastic viscosity (PV), yield point (VP) and gel strengths at 10 second and 10 minute intervals were obtained as described in Applied Mud Technology, 7th Edition (1981), pages 3 and 4, published by Imco Services.

Molecular Weights

Molecular weights were determined by gel permeation chromatography using polystyrene sulfonic acid as the standard.

For a fuller understanding of the nature and advantages of this invention, reference may be made to the following examples. These examples are given merely to illustrate the invention and are not to be constructed in a limiting sense.

In the examples all references to pounds per barrel of drilling fluid are to a 42 gallon barrel of the drilling fluid.

EXAMPLE I

Homopolymer of Acrylic Acid

For purposes of comparison with the copolymers of this invention, an additive, viz., a homopolymer of acrylic acid having a weight average molecular weight of about 250,000-300,000, was evaluated as a fluid loss control additive in a mud containing 500 ppm calcium ions. Concentration was 2 pounds per barrel. The additive was a mixture of polyacrylic acid (70% by wt.) and soda ash (30% by wt.). Thus, the polymer was partially neutralized. Fluid loss evaluation was conducted at 300° F., 500 psi for 30 minutes without heat aging. Fluid loss was in excess of 120 ml indicating that the homopolymer of acrylic acid is not very effective under these conditions.

EXAMPLE II

Preparation of Acrylic Acid—Itaconic Acid Copolymer (95/5 Weight %)

61.5 parts by weight of glacial acrylic acid was mixed with 10.5 parts by weight of 31% by weight sodium itaconate solution. The solution was partially neutralized with 3 parts by weight soda ash and then polymerized adiabatically using ammonium persulfate (0.45 parts by weight)/sodium metabisulfite (0.45 parts by weight)/sodium thiosulfate (0.8 parts by weight) as redox catalyst. At the end of the polymerization, the product was dried and ground (≦20 mesh) for evaluation. The copolymer was a partially neutralized sodium salt.

The weight average molecular weight of this copolymer is about 280,000.

The copolymers in Table II below, in their partially neutralized sodium salt form, were prepared in the same manner as the copolymer of Example II above. Variations in reactants are tabulated below. All quantities are parts by weight (pbw).

TABLE II

| Ex. No. | Acrylic Acid (pbw) | 31% pbw Soln Sodium Itaconate (pbw) | Soda Ash (pbw) | Ammonium Persulfate (pbw) | Sodium Metabisulfite (pbw) | Sodium Thiosulfate (pbw) | Wt. % Acrylic Acid/ Itaconic Acid |
|---|---|---|---|---|---|---|---|
| II A* | 61.5 | 10.5 | 3 | 0.22 | 0.22 | 0.4 | 95/5 |
| II B** | 61.5 | 10.5 | 3 | 0.15 | 0.15 | 0.3 | 95/5 |
| II C | 61.5 | 22.6 | 3 | 0.45 | 0.45 | 0.8 | 90/10 |
| II D | 78.0 | 6.8 | 4 | 0.55 | 0.55 | 0.63 | 97.5/2.5 |

*Wt. average molecular weight is 370,000
**Wt. average molecular weight is 400,000

In the following tables, fluid loss data is presented for muds containing copolymers of acrylic acid-itaconic acid in partially or completely neutralized sodium salt form as shown.

For purposes of comparison, the blanks (no fluid loss control additive present) for high calcium, high chloride muds were exposed to high temperature, high pressure fluid loss conditions for thirty minutes. Fluid loss was ≧200 ml as shown in Table III below.

TABLE III
(No fluid loss control additive present)

| Mud | 16 Hr Heat Aging Temp (°F.) | Temp (°F.) | Pr (psi) | Fluid Loss After 30 Min (ml) | Filter Cake | PV (cps) | YP | 10 Sec Gel (lbs/100 ft²) | 10 Min Gel (lbs/100 ft²) |
|---|---|---|---|---|---|---|---|---|---|
| Fresh water | — | 77 | 100 | 13.5 | — | 33 | 215 | 144 | 145 |
| Fresh water | 150 | 77 | 100 | 13.4 | — | 79 | 62 | 59 | 84 |
| Seawater II | — | 200 | 500 | 190 | 9/16" cake | 7 | 25 | 17 | 17 |
| 2,000 ppm calcium | — | 200 | 500 | 190 | 8/16" cake | 6 | 46 | 16 | 16 |
| 2,000 ppm calcium | 350* | 200 | 500 | 230 | | 7 | 22 | 12 | 12 |

*Static heat aged

TABLE IV

| Copolymer of Ex. II Acrylic Acid (wt %) | Monomer Component Itaconic Acid (wt %) | Dosage lbs/bbl | Mud | 16 Hr Heat Aging Temp (°F.) | Temp (°F.) | Pr (psi) | Fluid Loss After 30 Min (ml) | Filter Cake | PV (cps) | YP | 10 Sec Gel (lbs/100 ft²) | 10 Min Gel (lbs/100 ft²) |
|---|---|---|---|---|---|---|---|---|---|---|---|---|
| 95 | 5 | 5* | Fresh water | 150 | 77 | 100 | 5.5 | 3/32" soft, wet | 72 | 68 | 14 | 16 |
| 95 | 5 | 5* | Fresh water | 300 | 77 | 100 | 6.2 | 3/22" soft, wet | 54 | 58 | 13 | 13 |
| 95 | 5 | 5* | Fresh water | 400 | 77 | 100 | 7.4 | 2/32" soft, wet | 44 | 42 | 10 | 10 |

*Copolymer present as 70/30 wt. % blend of copolymer/soda ash which results in a 70% neutralized copolymer (sodium salt form).

TABLE V

| Copolymer of Ex. II Acrylic Acid (wt %) | Monomer Component Itaconic Acid (wt %) | Dosage* lbs/bbl | Mud | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel (lbs/100 ft²) |
|---|---|---|---|---|---|---|---|---|---|---|---|---|
| 95 | 5 | 3 | 2000 ppm Ca | 150 | 77 | 100 | 67 | 16/32" uniform | 9 | 8 | 7 | 11 |
| 95 | 5 | 3 | 2000 ppm Ca | 400 | 77 | 100 | 59 | 18/32" uniform | 9 | 6 | 6 | 34 |
| 95 | 5 | 3 | 2000 ppm Ca | 400 | 300 | 500 | 56 | 12/16" uniform | 21 | 10 | 2 | 8 |
| 95 | 5 | 5 | 2000 ppm Ca | — | 200 | 500 | 16 | 4/32" uniform | 45 | 32 | 6 | 16 |
| 95 | 5 | 5 | 2000 ppm Ca | 350** | 200 | 500 | 16 | 2/32" uniform | 28 | 13 | 5 | 6 |

*Copolymer present as 70/30 wt. % blend of copolymer/soda ash which results in a 70% neutralized copolymer (sodium salt form).
**Static heat aged

| Copolymer of Ex. II* Acrylic Acid (wt %) | Monomer Component Itaconic Acid (wt %) | Dosage lbs/bbl | Mud | 16 Hr Heat Aging Temp (°F.) | Temp (°F.) | Pr (psi) | Fluid Loss After 30 Min (ml) | Filter Cake | PV (cps) | YP | 10 Sec Gel (lbs/100 ft²) | 10 Min Gel (lbs/100 ft²) |
|---|---|---|---|---|---|---|---|---|---|---|---|---|
| 95 | 5 | 4 | 2000 ppm Ca | — | 300 | 500 | 112 | Gelled | 43 | 26 | 10 | 24 |
| 95 | 5 | 4 | 2000 ppm Ca | 400 | 300 | 500 | 59 | Gelled | 31 | 19 | 11 | 79 |
| 95 | 5 | 5 | 2000 ppm Ca | — | 300 | 500 | 24 | 4/32" uniform | 36 | 15 | 4 | 11 |
| 95 | 5 | 5 | 2000 ppm Ca | 400 | 300 | 500 | 28 | 6/32" uniform | 19 | 5 | 3 | 4 |
| 95 | 5 | 6 | 2000 ppm Ca | — | 300 | 500 | 22 | 2/32" uniform | 54 | 26 | 20 | 44 |
| 95 | 5 | 6 | 2000 ppm Ca | 400 | 300 | 500 | 20 | 10/32" uniform | 38 | 44 | 43 | 68 |

*Partially neutralized copolymer (sodium salt)

TABLE VI

Seawater Mud II

| Copolymer of Ex. II | | | Fluid Loss Test Conditions | | | | | Mud Rheology | | | |
|---|---|---|---|---|---|---|---|---|---|---|---|
| Monomer Acrylic Acid (wt %) | Component Itaconic Acid (wt %) | Dosage lbs/bbl | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| 95 | 5 | 5* | — | 300 | 500 | 42 | 7/16" uniform | 10 | 1 | 1 | 1 |
| 95 | 5 | 5* | 400 | 300 | 500 | 31 | 6/16" uniform | 9 | 11 | 9 | 16 |
| 95 | 5 | 6* | — | 300 | 500 | 33 | 5/16" uniform | 34 | 60 | 20 | 42 |
| 95 | 5 | 6* | 400 | 300 | 500 | 32 | 6/16" soft | 9 | 11 | 8 | 13 |
| 95 | 5 | 5** | — | 200 | 500 | 21 | 2/32" uniform | 23 | 58 | 21 | 43 |
| 95 | 5 | 5** | 350*** | 200 | 500 | 22 | 2/32" uniform | 12 | 10 | 5 | 10 |
| 95 | 5 | 3** | 150 | 77 | 100 | 50 | 14/32" uniform | 15 | 8 | 11 | 25 |
| 95 | 5 | 3** | 300 | 77 | 100 | 49 | 14/32" uniform | 10 | 6 | 8 | 27 |
| 95 | 5 | 3** | 400 | 77 | 100 | 35 | 6/32" uniform | 8 | 9 | 12 | 32 |

*Copolymer present as partially neutralized copolymer (sodium salt)
**Copolymer present as 70/30 wt. % blend of copolymer/soda ash which results in a 70% neutralized copolymer (sodium salt form).
***Static heat aged

TABLE VII

Seawater Mud I

| Copolymer | | | Fluid Loss Test Conditions | | | | | Mud Rheology | | | |
|---|---|---|---|---|---|---|---|---|---|---|---|
| Monomer Acrylic Acid (wt %) | Component Itaconic Acid (wt %) | Dosage* lbs/bbl | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| 95 | 5 Copolymer of Ex II B | 2 | — | 300 | 500 | 40 | 5/16" uniform | 34 | 24 | 16 | 43 |
| 95 | 5 | 2 | 400 | 300 | 500 | 64 | 6/16" uniform | 14 | 29 | 22 | 27 |
| 95 | 5 Copolymer of Ex II A | 2 | — | 300 | 500 | 46 | 5/16" uniform | 23 | 25 | 14 | 30 |
| 95 | 5 | 2 | 400 | 300 | 500 | 68 | 5/16" uniform | 14 | 27 | 13 | 33 |
| 95 | 5 Copolymer of Ex II | 2 | — | 300 | 500 | 46 | 4/16" uniform | 22 | 17 | 14 | 30 |
| 95 | 5 | 2 | 400 | 300 | 500 | 86 | 5/16" uniform | 12 | 35 | 29 | 35 |

*Copolymer present as 70/30 wt. % blend of copolymer/soda ash which results in a 70% neutralized copolymer (sodium salt form).

TABLE VIII

Seawater Mud I

| Copolymer | | | Fluid Loss Test Conditions | | | | | Mud Rheology | | | |
|---|---|---|---|---|---|---|---|---|---|---|---|
| Monomer Acrylic Acid (wt %) | Component Itaconic Acid (wt %) | Dosage* lbs/bbl | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| 95 | 5 Copolymer of Ex II | 2 | — | 300 | 500 | 48 | Wet, loose | 34 | 11 | 12 | 21 |
| 95 | 5 | 2 | 300 | 300 | 500 | 57 | | | | | |
| 95 | 5 | 2 | 400 | 300 | 500 | 58 | Wet, loose | 19 | 12 | 8 | 15 |
| 90 | 10 Copolymer of Ex II C | 2 | — | 300 | 500 | 62 | — | 32 | 22 | 13 | 32 |
| 90 | 10 | 2 | 300 | 300 | 500 | 77 | — | 19 | 22 | 15 | 32 |
| 90 | 10 | 2 | 400 | 300 | 500 | 108 | — | — | — | — | — |

*Copolymer present as 70/30 wt. % blend of copolymer/soda ash which results in a 70% neutralized copolymer (sodium salt form).

TABLE IX

Seawater Mud I

| Copolymer of Ex. II | | | Fluid Loss Test Conditions | | | | | Mud Rheology | | | |
|---|---|---|---|---|---|---|---|---|---|---|---|
| Monomer Acrylic Acid (wt %) | Component Itaconic Acid (wt %) | Dosage* lbs/bbl | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft²) | 10 Min Gel |
| 95 | 5 | 2 | — | 300 | 500 | 54 | Wet, loose | 34 | 11 | 12 | 21 |
| 95 | 5 | 2 | 400 | 300 | 500 | 58 | Wet, loose | 19 | 12 | 8 | 15 |
| 95 | 5 | 3 | — | 300 | 500 | 38 | 8/32" wet, loose | 23 | 9 | 4 | 8 |
| 95 | 5 | 3 | 400 | 300 | 500 | 36 | 8/32" wet, loose | 15 | 23 | 22 | 33 |
| 95 | 5 | 4 | — | 300 | 500 | 23 | 8/32" wet | 33 | 16 | 5 | 8 |
| 95 | 5 | 4 | 400 | 300 | 500 | 42 | 12/32" wet | 25 | 29 | 23 | 32 |
| 95 | 5 | 5 | — | 300 | 500 | 20 | 7/32" wet, loose | 37 | 16 | 5 | 8 |
| 95 | 5 | 5 | 400 | 300 | 500 | 36 | 12/32" wet | 26 | 27 | 19 | 33 |

*Copolymer present as 70/30 wt. % blend of copolymer/soda ash which results in a 70% neutralized copolymer (sodium salt form).

TABLE X

| Copolymer of Ex. II D* | | | | Fluid Loss Test Conditions | | | | | Mud Rheology | | | |
|---|---|---|---|---|---|---|---|---|---|---|---|---|
| Monomer Component | | | | 16 Hr Heat | | | Fluid Loss | | | | 10 Sec | 10 Min |
| Acrylic Acid (wt %) | Itaconic Acid (wt %) | Dosage lbs/bbl | Mud | Aging Temp (°F.) | Temp (°F.) | Pr (psi) | After 30 min (ml) | Filter Cake | PV (cps) | YP | Gel (lbs/100 ft$^2$) | Gel |
| 97.5 | 2.5 | 5 | 2000 ppm Ca | 400 | 300 | 500 | 64 ml | ⅜" thick | 40 | 22 | 7 | 23 |
| — | — | — | 2000 ppm Ca | 400 | 300 | 500 | 196 ml** | — | 7 | 48 | 17 | 17 |

*partially neutralized copolymer (sodium salt)
**5½ minutes
Note:
This copolymer was found not to be very effective in thinner base seawater mud.

nience is referred to as AA-ITA in the Tables and was a partially neutralized sodium salt.

TABLE XII

| | | | Fluid Loss Test Conditions | | | | | Mud Rheology | | | |
|---|---|---|---|---|---|---|---|---|---|---|---|
| Copolymer Composition | Dosage lbs/bbl | Mud | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft$^2$) | 10 Min Gel |
| AA-AM | 5 | 2000 ppm Ca | — | 300 | 500 | 225 | 26/16" thick | 23 | 17 | 9 | 29 |
| AA-ITA | 5 | 2000 ppm Ca | — | 300 | 500 | 24 | 2/16" thick | 36 | 15 | 4 | 11 |
| AA-AM | 5 | 2000 ppm Ca | 400 | 300 | 500 | 79 | 1 12/16" thick | 34 | 11 | 3 | 12 |
| AA-ITA | 5 | 2000 ppm Ca | 400 | 300 | 500 | 28 | 3/16" thick | 19 | 5 | 3 | 4 |
| AA-AM | 6 | 2000 ppm Ca | — | 300 | 500 | 80 | 1 8/16" thick | 41 | 32 | 11 | 33 |
| AA-ITA | 6 | 2000 ppm Ca | — | 300 | 500 | 22 | 1/16" thick | 54 | 26 | 10 | 44 |
| AA-AM | 6 | 2000 ppm Ca | 400 | 300 | 500 | 102 | 2" thick | 39 | 50 | 70 | 128 |
| AA-ITA | 6 | 2000 ppm Ca | 400 | 300 | 500 | 20 | 5/16" thick | 38 | 44 | 43 | 68 |
| | | | Seawater Mud II | | | | | | | | |
| AA-AM | 5 | | — | 300 | 500 | 110 | 1" thick | 28 | 9 | 3 | 9 |
| AA-ITA | 5 | | — | 300 | 500 | 42 | 7/16" thick | 10 | 1 | 1 | 1 |
| AA-AM | 5 | | 400 | 300 | 500 | 67 | 11/16th thick | 10 | 1 | 1 | 2 |
| AA-ITA | 5 | | 400 | 300 | 500 | 31 | 6/16" thick | 9 | 11 | 9 | 16 |
| AA-AM | 6 | | — | 300 | 500 | 56 | 13/16" thick | 30 | 12 | 3 | 5 |
| AA-ITA | 6 | | — | 300 | 500 | 33 | 5/16" thick | 34 | 60 | 20 | 42 |
| AA-AM | 6 | | 400 | 300 | 500 | 37 | 4/16" thick | 11 | 3 | 1 | 4 |
| AA-ITA | 6 | | 400 | 300 | 500 | 32 | 6/16" thick | 9 | 11 | 8 | 13 |

EXAMPLE III

The partially neutralized ammonium salt of 95 weight % acrylic acid and 5 weight % itaconic acid was prepared as described in Example II except that ammonium itaconate was used instead of sodium itaconate and ammonium carbonate was used instead of soda ash.

Table XI sets forth fluid loss data in seawater mud II for this polymer.

TABLE XI

| Copolymer* | | | | Fluid Loss Test Conditions | | | | | Mud Rheology | | | |
|---|---|---|---|---|---|---|---|---|---|---|---|---|
| Monomer Acrylic Acid (wt %) | Component Itaconic Acid (wt %) | Dosage lbs/bbl | Mud | 16 Hr Heat Aging Temp (°F.) | Temp (°F.) | Pr (psi) | Fluid Loss After 30 min (ml) | Filter Cake | PV (cps) | YP | 10 Sec Gel (lbs/100 ft$^2$) | 10 Min Gel |
| 95 | 5 | 4 | Seawater II | — | 300 | 500 | 82 ml | 10/16" | 9 | 3 | 1 | 7 |

*Partially neutralized copolymer (ammonium salt)

EXAMPLE IV

Additional comparisons have been made between a copolymer of Example II (95 weight % acrylic acid and 5 weight % of itaconic acid) and commercial sodium acrylate-acrylamide copolymer of approximately 70 mole or weight % sodium acrylate and 30 mole or weight % acrylamide having a molecular weight of about 200,000 with respect to their fluid loss properties in drilling fluids containing high calcium and chloride ions. The data indicates that the sodium acrylate-acrylamide copolymer is not as effective as the acrylic acid—itaconic acid copolymers under these more severe conditions. The data appears in Table X below.

The sodium acrylate-acrylamide copolymer for convenience is referred to as AA-AM in the Tables while the acrylic acid-itaconic acid copolymer for conve- While the invention has been described with reference to certain specific embodiments thereof, it is understood that it is not to be so limited since alterations and changes may be made therein which are within the full intended scope of the appended claims.

What is claimed is:

1. A copolymer of (1) from about 80% to about 98% by weight of acrylic acid and (2) from about 2% to about 20% by weight of itaconic acid, said copolymer having a weight average molecular weight of between about 100,000 to about 1,000,000, being in the form of its free acid or partially or completely sodium, potassium or ammonium neutralized salt and being at least water dispersible, said partially neutralized salt being prepared by reacting carboxylic groups present in said acrylic acid and said itaconic acid with neutralizing agent, said copolymer being useful as a fluid loss control additive for aqueous drilling fluids.

2. The copolymer of claim 1 wherein said weight average molecular weight is between about 100,000 to about 500,000.

3. The copolymer of claim 2 in which said copolymer is a copolymer of about 95% by weight acrylic acid and about 5% by weight itaconic acid in the form of its free acid or partially or completely sodium, potassium or ammonium neutralized salt.

4. The copolymer of claim 2 in which said copolymer is a copolymer of about 90% by weight acrylic acid and about 10% by weight itaconic acid in the form of its free acid or partially or completely sodium, potassium or ammonium neutralized salt.

5. The copolymer of claim 2 in which said copolymer is a copolymer of about 80% by weight acrylic acid and about 20% by weight itaconic acid in the form of its free acid or partially or completely sodium, potassium or ammonium neutralized salt.

6. The copolymer of claim 2 in which said copolymer is a copolymer of about 98% by weight acrylic acid and about 2% by weight itaconic acid in the form of its free acid or partially or completely sodium, potassium or ammonium neutralized salt.

\* \* \* \* \*